United States Patent
Craig et al.

(10) Patent No.: US 7,729,345 B2
(45) Date of Patent: *Jun. 1, 2010

(54) SCALABLE VOICE OVER IP SYSTEM PROVIDING INDEPENDENT CALL BRIDGING FOR OUTBOUND CALLS INITIATED BY USER INTERFACE APPLICATIONS

(75) Inventors: James Alan Craig, Little Silver, NJ (US); Kelly Wycall Phillips, Richmond, VA (US); Narasimha K. Nayak, Glen Allen, VA (US)

(73) Assignee: Cisco Technology, Inc., San Jose, CA (US)

( * ) Notice: Subject to any disclaimer, the term of this patent is extended or adjusted under 35 U.S.C. 154(b) by 1366 days.

This patent is subject to a terminal disclaimer.

(21) Appl. No.: 11/155,498

(22) Filed: Jun. 20, 2005

(65) Prior Publication Data

US 2005/0232250 A1    Oct. 20, 2005

Related U.S. Application Data (63) Continuation of application No. 09/606,692, filed on Jun. 30, 2000, now Pat. No. 6,930,999, which is a continuation-in-part of application No. 09/479,235, filed on Jan. 7, 2000, now Pat. No. 6,735,288.

(51) Int. Cl.
| | |
|---|---|
| *H04L 12/66* | (2006.01) |
| *H04J 3/16* | (2006.01) |
| *H04J 3/22* | (2006.01) |
| *H04M 1/64* | (2006.01) |
| *H04M 7/00* | (2006.01) |

(52) U.S. Cl. .................. 370/389; 370/352; 370/467; 379/67; 379/220

(58) Field of Classification Search ......... 370/259–467; 379/88–93, 219–224; 709/201–250
See application file for complete search history.

(56) References Cited

U.S. PATENT DOCUMENTS 4,837,798 A    6/1989   Cohen et al.

(Continued)

OTHER PUBLICATIONS

Thom, "The Multimedia Communications Standard for local Area Networks", H.323 Summary (Aug. 29, 1997).

(Continued)

*Primary Examiner*—Man Phan
(74) *Attorney, Agent, or Firm*—Leon R. Turkevich (57) ABSTRACT

An IP telephony gateway and a user interface resource enable a subscriber to place an outgoing call according to the voice over IP (H.323) protocol to a destination party from a user interface session of an intelligent dial tone service such as voice activated dialing, and resume the user interface session upon completion of the outgoing call with the destination party. The IP telephony gateway establishes a user interface session for the subscriber with the user interface resource across a first Real Time Protocol (RTP) data stream. The user interface resource initiates a second RTP data stream to a destination party in response to reception of a prescribed command from the subscriber. Although an RTP bridge connecting the first and second RTP data streams can be maintained by the user interface resource, the user interface resource may also use the Empty Capability Set feature in the H.323 standard to cause the IP telephony gateway to close the first and second RTP data streams to the user interface resource. The user interface resource then issues Non-Empty Capability Set messages to the IP telephony gateway for the first and second RTP data streams, causing the IP telephony gateway to internally bridge the first and second RTP data streams. The user interface resource monitors connections between the subscriber and the destination party, and upon detecting a disconnect by the destination party causes the IP telephony gateway to resume the user interface session, by repeating the sequence of sending Empty Capability Set and Non-Empty Capability Set messages to the IP telephony gateway to break down the bridge and re-establish the connection between the subscriber and the user interface resource.

26 Claims, 3 Drawing Sheets

U.S. PATENT DOCUMENTS

| | | | |
|---|---|---|---|
| 5,818,446 A * | 10/1998 | Bertram et al. | 715/746 |
| 5,857,013 A | 1/1999 | Yue et al. | |
| 5,909,431 A | 6/1999 | Kuthyar et al. | |
| 5,943,403 A | 8/1999 | Richardson, Jr. et al. | |
| 6,215,864 B1 * | 4/2001 | Goyal et al. | 379/221.11 |
| 6,259,691 B1 | 7/2001 | Naudus | |
| 6,269,100 B1 | 7/2001 | Christie, IV et al. | |
| 6,396,840 B1 | 5/2002 | Rose et al. | |
| 6,404,746 B1 | 6/2002 | Cave et al. | |
| 6,404,807 B1 | 6/2002 | Mehrabanzad et al. | |
| 6,456,615 B1 | 9/2002 | Kikinis | |
| 6,625,258 B1 | 9/2003 | Ram et al. | |
| 6,636,508 B1 | 10/2003 | Li et al. | |
| 6,636,528 B1 | 10/2003 | Korpi et al. | |
| 6,636,596 B1 | 10/2003 | Gallant et al. | |
| 6,694,429 B1 * | 2/2004 | Kalmanek et al. | 713/153 |
| 7,099,304 B2 * | 8/2006 | Liu et al. | 370/352 |
| 2006/0268844 A1 * | 11/2006 | Mori et al. | 370/352 |
| 2007/0192325 A1 * | 8/2007 | Morris | 707/10 |
| 2007/0255952 A1 * | 11/2007 | Zhou | 713/168 |
| 2008/0176533 A1 * | 7/2008 | Leleu | 455/411 |

OTHER PUBLICATIONS

Purvis et al., "RE: Third party-initiated pause and re-routing", H.323 Implementors Archive for 1999.

Kotha, "Deploying H.323 Applications in Cisco Networks", Cisco Systems, Inc. White Paper (1998).

* cited by examiner

Figure 3C

SCALABLE VOICE OVER IP SYSTEM PROVIDING INDEPENDENT CALL BRIDGING FOR OUTBOUND CALLS INITIATED BY USER INTERFACE APPLICATIONS

CROSS REFERENCE TO RELATED APPLICATIONS

This application is a continuation of copending application Ser. No. 09/606,692, filed Jun. 30, 2000 and having issued on Aug. 16, 2005 as U.S. Pat. No. 6,930,999, which is a continuation-in-part of commonly-assigned, application Ser. No. 09/479,235, filed Jan. 7, 2000, having issued as U.S. Pat. No. 6,735,288, the disclosure of which is incorporated in its entirety herein by reference.

BACKGROUND OF THE INVENTION

1. Field of the Invention

The present invention relates to systems configured for providing advanced telephony-type services for subscribers in a voice over Internet Protocol (IP) network according to H.323 protocol.

2. Description of the Related Art

The evolution of the public switched telephone network has resulted in a variety of voice applications and services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure. Hence, the reliance on proprietary protocols and closed development environments by telecommunications equipment providers has limited service providers to vendor-specific implementations of voice and telephony services.

Of particular concern is the limited scalability of user interface applications configured for providing prescribed services to subscribers based on deployed telephony applications. In particular, user interface applications typically are deployed within a single telephony component of the telecommunications network, limiting the ability of the user interface applications to be distributed across multiple components within the telecommunications network.

One example of limited scalability in a user interface application involves conventional voice mail applications that limit a voice mail subscriber to merely retrieve stored voice mail messages, and possibly forward a voice mail message to another voice mail subscriber within the same voice mail system. However, these conventional voice mail applications do not permit a voice mail subscriber to perform more advanced operations. Moreover, these conventional voice mail applications are typically deployed on a single telephony component, limiting the scalability of the conventional voice mail application as the number of subscribers are increased.

U.S. Pat. No. 5,857,013 to Yue et al. suggests the desirability of enabling a mobile telephone user to access his or her associated voice mail system and have the system automatically call a number of a person, having left a message, without leaving the voice mail service. Yue et al. merely suggests use of a Bell South service circuit node, available from AT&T network systems, where the system software is coded in the service logic language within a UNIX environment. Yue et al., however, provides no disclosure of how such a system would be implemented outside the service circuit node, for example in a telephone network such as a mobile telephone system or the public switched telephone network. Hence, Yue et al. suffers from the same disadvantages described above that deployment on a single telephony component limits the scalability of the voice application to be deployed.

Another example of limited scalability in a user interface application involves voice activated dialing applications, where the subscriber relies on speech recognition resources within an interactive voice response unit to initiate an outgoing call in response to a spoken command. For example, a subscriber accessing the interactive voice response unit may utter the phrase "call mom" to initiate a call to a number preprogrammed by the subscriber; the interactive voice response unit, in response to receiving the phrase "call mom", interprets the phrase and accesses the preprogrammed number in order to initiate an outgoing call for the subscriber. As described above, however, such applications are severely limited to a telephony component (such as an integrated voice response unit integrated with a telephony switch) having specialized resources programmed by switch vendors, hence lack scalability for wide scale deployment.

Voice over IP technology is under development as part of an alternative open packet telephony communications network, distinct from the public (circuit switched) telephone network, capable of using packet switched networks for integrating voice, data, facsimile, and Internet services, and the like. New packet telephony voice services are being built from open standards such as The International Telecommunications Union (ITU) Recommendation H.323. Recommendation H.323 defines the components, procedures, and protocols necessary to provide audiovisual communications on local area networks. Recommendation H.323 is based on the Real Time Protocol/Control Protocol (RTP/RTCP) of the Internet Engineering Task Force (IETF), and applies to either point-to-point or multipoint sessions, and references many other ITU recommendations, including H.225 and H.245. Recommendation H.225 specifies messages for call control including signaling, registration and admissions, and packetization/synchronization of media streams. Recommendation H.245 specifies messages for opening and closing channels for media streams, and other commands, requests and indications. However, the current H.323 standard does not provide a direct means for enabling a voice mail subscriber to place an outbound call from a voice mail system, and then return to the voice mailbox after call completion.

Hence, the existing voice over IP technology has yet to produce a scalable technology for deployment of advanced voice application services across multiple platforms of an IP-based telecommunications system.

SUMMARY OF THE INVENTION

There is a need for enhanced IP-based communication services that enable a services subscriber to utilize a user interface application, such as a unified messaging application or a voice activated dialing application, for initiating an outgoing call from the user interface application, and return to the user interface application upon completion of the outgoing call, while maintaining a single voice over IP connection with the user interface application.

There is also a need for an arrangement that enables a user interface application to initiate and redirect voice over IP connections between a subscriber and a called party without introducing substantial processing requirements on the user interface application. The user interface application may be configured for selected user applications, for example voice activated dialing.

These and other needs are attained by the present invention, where an IP telephony gateway and a user interface resource enable a subscriber to place an outgoing call to a destination party from a user interface session according to the voice over IP (H.323) protocol, and resume interaction with the user interface session upon completion of the outgoing call with the destination party. The IP telephony gateway generates Real Time Protocol (RTP) data streams in response to commands from the user interface resource, which monitors connections between the subscriber and the destination party; based on detecting a prescribed condition between the subscriber and the destination party, the user interface resource causes the IP telephony gateway to resume the user interface session, for example using the Empty Capability Set feature in the H.323 standard to perform the outbound call with return capability.

According to one aspect of the present invention, a method is provided in a user interface resource configured for providing telecommunications user interface services to a subscriber. The method includes establishing a first Real Time Protocol (RTP) data stream for a user interface session with the subscriber according to H.323 protocol, initiating a second RTP data stream to a destination party in response to reception of a prescribed command from the subscriber, and connecting the first and second RTP data streams in response to detecting a first prescribed condition from the destination party. The user interface session is resumed with the user interface resource in response to detecting a second prescribed condition between the subscriber and the destination party. The initiation of the second RTP data stream, and the connecting under the control of the user interface resource enables the user interface resource to perform the outbound call with return capability, enabling the subscriber to return back to the user interface session upon completion of the outbound call. Hence, the availability of outbound call with return capability enables the user interface resource to provide advanced call initiation and bridging services for the subscriber for any number of user interface applications, for example voice activated dialing applications, voice mail callback applications, voice activated conferencing services, etc. Moreover, the availability of outbound call with return capability enables deployment of scalable application services for unified communications across an open standards type network, such as an IP network.

Another aspect of the present invention provides a system configured for providing user interface services to a subscriber over an Internet protocol (IP) telephony link. The system includes an IP telephony gateway configured for establishing Real Time Protocol (RTP) data stream connections according to H.323 protocol, and a user interface resource, for example a voice activated dialing application. The user interface resource is configured for establishing a first RTP data stream connection with the subscriber via the IP telephony gateway for a user interface session, and initiating a second RTP data stream to a destination party for establishment of a call between the subscriber and the destination party. The user interface resource resumes the user interface session with the subscriber in response to a detected disconnect condition between the subscriber and the destination party.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The disclosed embodiment is directed to an arrangement for initiating an outgoing call by a user interface application on a voice over IP connection, and returning the subscriber to the user interface application upon call completion. In particular, the disclosed embodiment expands upon the teachings of the above-incorporated application Ser. No. 09/479, 235 by enabling any user interface application, for example a voice mail system as disclosed in the above-incorporated application Ser. No. 09/479,235, an IP-based voice activated dialing application, or an IP based call switching center, to initiate an outgoing call and return the subscriber after call completion. Hence, user interface applications can be deployed as scalable subscriber services within an IP network.

Figure 1:
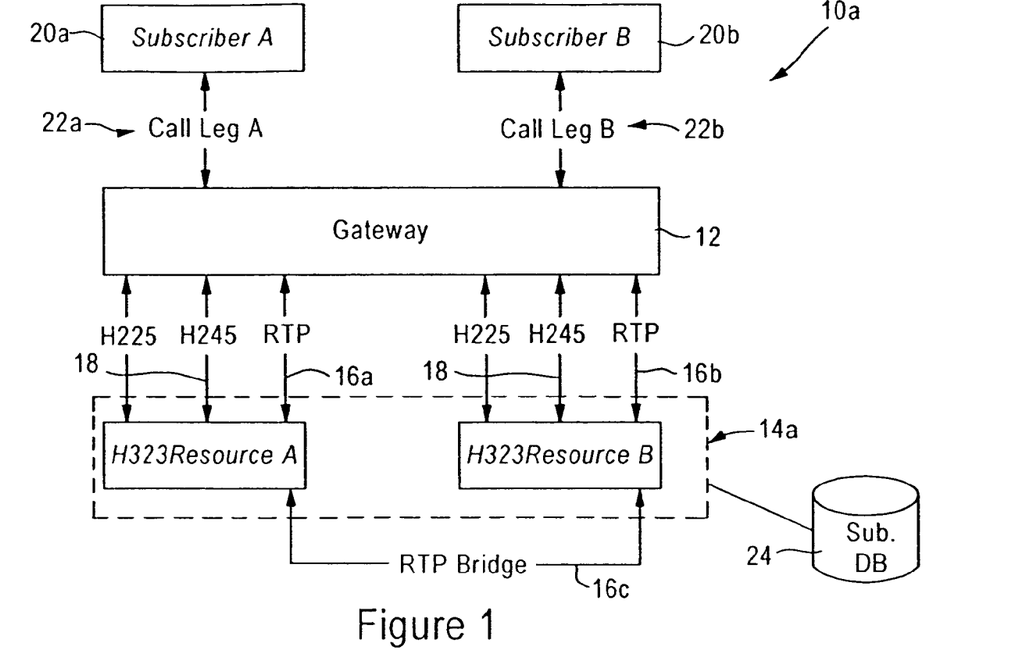
FIG. 1 is a block diagram illustrating a voice over IP user interface system configured for redirecting RTP data streams according to one embodiment of the present invention.
Figure 2:
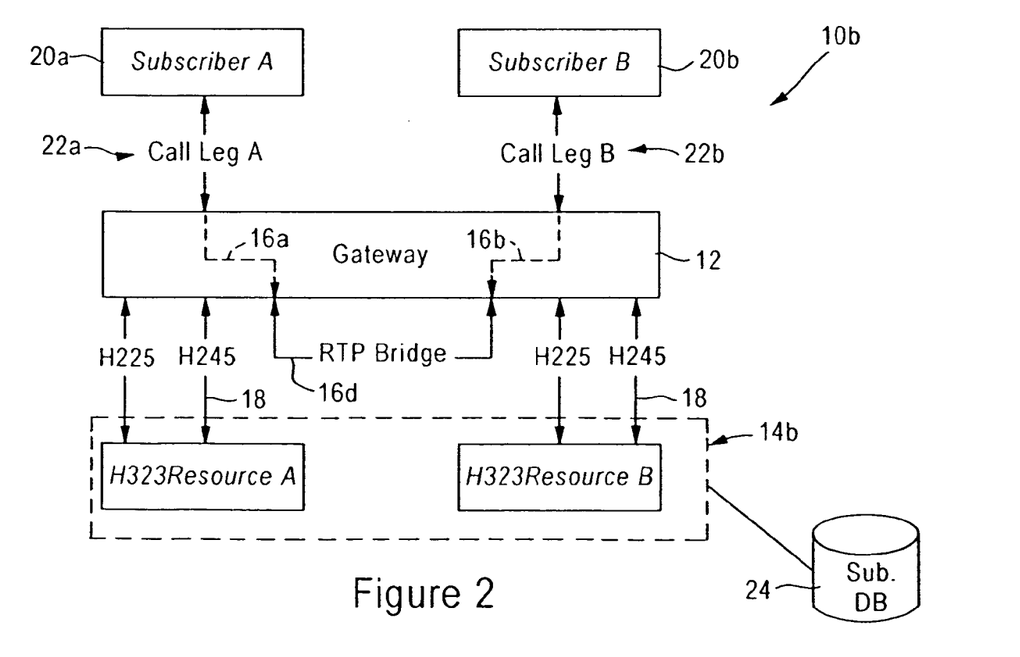
FIG. 2 is a block diagram illustrating another voice over IP user interface system configured for redirecting RTP data streams according to another embodiment of the present invention.

FIGS. 1 and 2 are diagrams illustrating voice over IP user interface systems, configured for redirecting RTP data streams according to first and second embodiments of the present invention, respectively. Each system 10 includes an IP telephony gateway 12 configured for establishing Real Time Protocol (RTP) data stream connections according to H.323 protocol. Each system 10 also includes a user interface resource 14, for example an IP-based voice mail system or an IP based voice activated dialing application, configured for controlling the establishment of the RTP data streams 16 by exchanging control and signaling commands across the H.245 channel 18. In particular, the user interface resource 14 is implemented as an H.323 compliant software resource configured for executing selected user interface applications, for example a voice mail system as described in detail in the above-incorporated application Ser. No. 09/479,235, or a voice activated dialing application configured for initiating outgoing calls in response to call commands uttered by the subscriber.

The user interface resource 14 controls the IP telephony gateway 12 via the H.245 channel 18 for call setup and tear down, and redirecting of voice media traffic along the RTP data streams 16. Note that the user interface resource 14 is illustrated as having discrete resources A and B for the sake of describing the RTP data streams 16a, 16b, 16c, and 16d although actual implementation of the user interface resource may use a single instance of an H.323 resource.

The IP telephony gateway 12, implemented for example using a Cisco AS5300 Universal Access Server, is configured for setting up call connections with subscribers 20 across a voice over IP link 22, or alternately a PSTN communication link.

The user interface resource 14 is configured for accessing a subscriber database 24 for execution of call commands supplied by the subscriber 20a. In particular, the subscriber database 24, implemented for example as an IMAP message store or an LDAP directory, is configured for storing prescribed commands that may be preprogrammed by an administrator, or customized by the subscriber. For example, the subscriber 20a may interact with the user interface application 14 for storage of prescribed names and telephone numbers. In addition, the user interface application 14 includes a speech recognition resource (not shown) and an interactive voice response resource having intelligent call control capabilities, enabling the subscriber to initiate an outgoing telephone call by uttering a command such as "call Mom", or by speaking the telephone number to be dialed.

Hence, the user interface resource 14 provides intelligent dial tone services for the subscriber, enabling execution of subscriber-specific commands based on accessing subscriber profile information from the database 24. As described below, these intelligent dial tone services can be deployed in a scalable manner that minimizes the use of resources within the user interface resource 14.

Figure 3A:
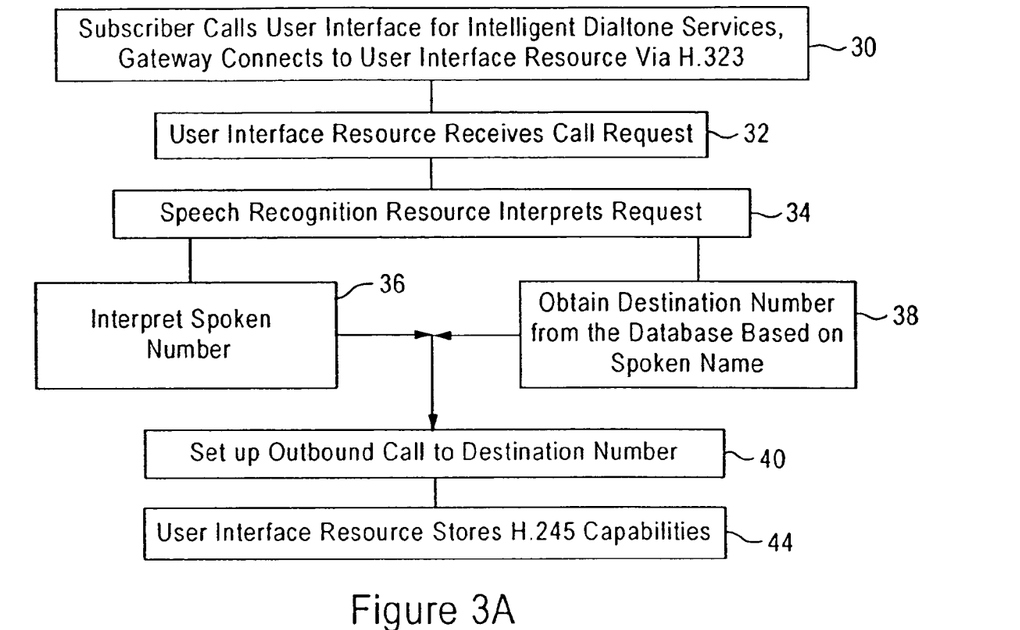
FIGS. 3A, 3B and 3C are diagrams summarizing a method in a user interface system for redirecting RTP data streams for placing an outgoing call and returning the subscriber to his or her user interface session after call completion according to an embodiment of the present invention.
Figure 3B:
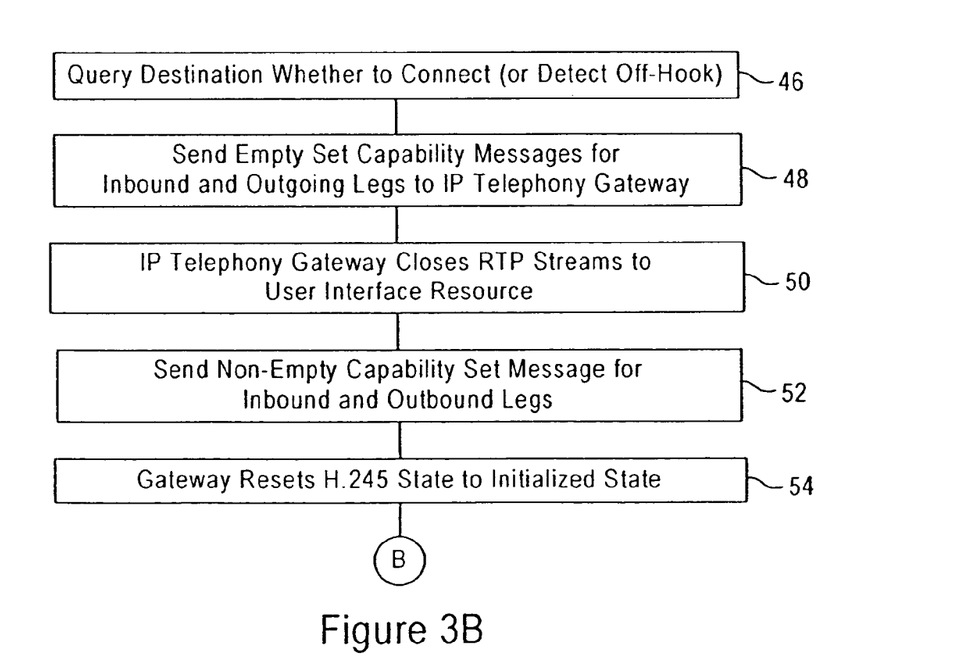
Figure 3C:
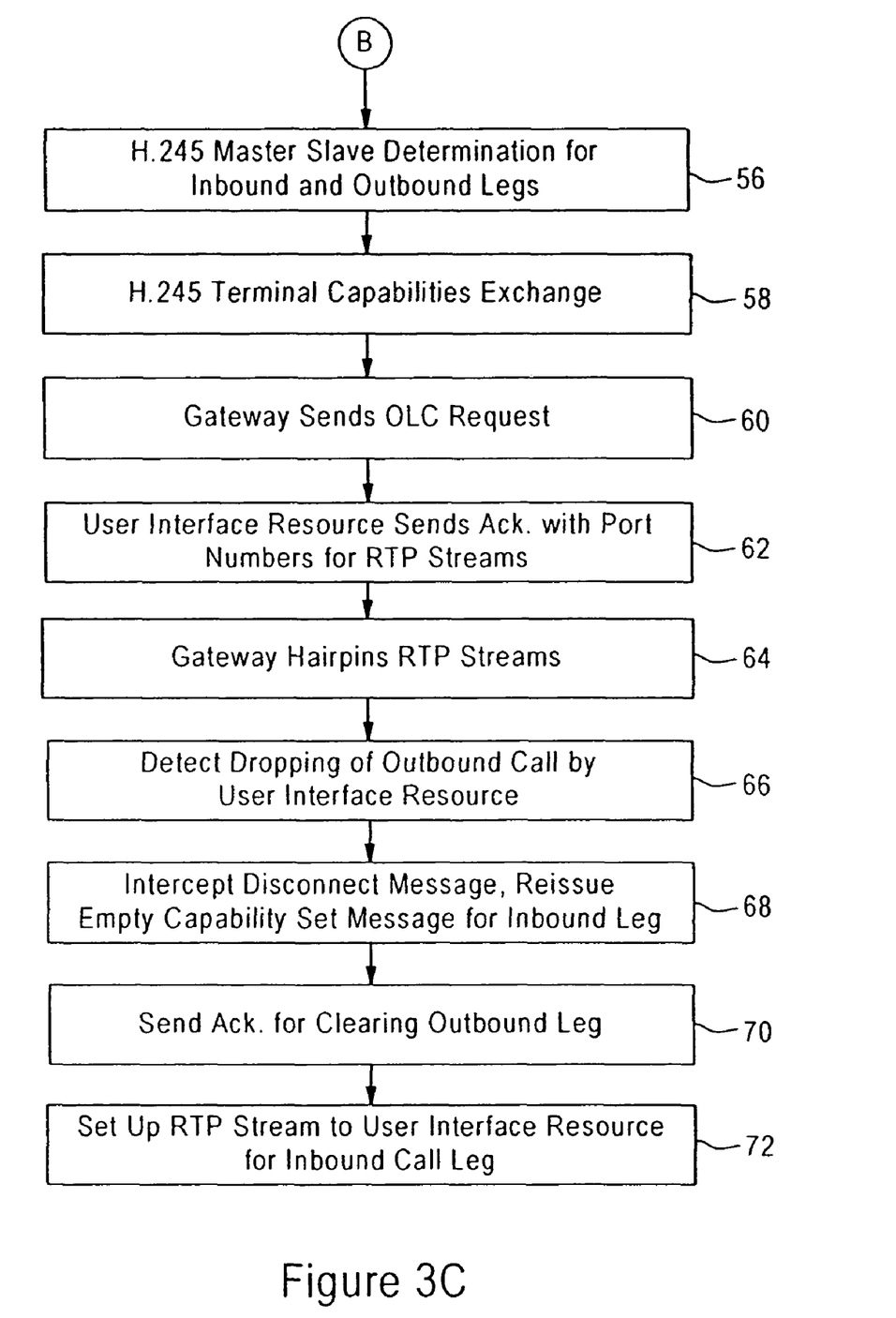

FIGS. 3A, 3B, and 3C summarize a method of placing an outgoing call and returning the subscriber 20a to his or her user interface session after call completion by the user interface resource 14b according to first and second embodiments of the present invention. The steps may be implemented as executable code stored on a tangible medium, for example a disk drive or a compact disc.

FIG. 3A illustrates the initial steps that are performed by user interface resources 14a and 14b according to the first and second embodiments, respectively. Typically a subscriber accesses his or her user interface session by placing a call to the user interface resource 14 in step 30. In particular, assume that the subscriber 20a places a voice over IP call to the user interface resource 14 via the IP telephony gateway 12; the user interface resource 14 establishes an RTP data stream 16a for a user interface session with the subscriber 20a by providing signaling instructions to the IP telephony gateway 12. The IP telephony gateway 12 in response supplies the RTP data stream 16a to the user interface resource 14, establishing a user interface session between the user interface resource and the subscriber 20a for intelligent dial tone services such as centralized management of unified messages (e.g., voice, fax, or e-mail messages), voice-activated retrieval of web content, or voice activated dialing.

Assume that during the course of the user interface session, the subscriber 20a decides to initiate a call to a destination party 20b but does not wish to terminate the user interface session. One problem with the H.323 standard is that the H.323 standard does not specify how a subscriber can return back to his or her user interface session upon completion of the outbound call to subscriber 20b; in addition, the H.323 standard does not specify how the RTP media streams 16 may be redirected through the IP telephony gateway 12 for voice quality and performance reasons.

According to the disclosed embodiment, the user interface resource 14 initiates bridging of the RTP audio streams of the two call legs 22a and 22b while maintaining control of both legs. Hence, a subscriber 20a may suspend his or her session with the user interface resource 14 and call the destination party 20b and then return to the user interface resource 14 upon completion of the call with the destination party 20b.

The user interface resource 14, in response to receiving a call request from the subscriber 20a via the RTP stream 16a in step 32, utilizes speech recognition resources in step 34 to interpret the call request. The user interface resource 14, in response to determining that the request is for initiating an outgoing call, interprets any spoken number within the call request to identify the destination number in step 36, or alternately obtains in step 38 the destination number from the list of stored numbers in the subscriber database 24 based on the spoken name interpret by the speech recognition resource. The user interface resource 14 then initiates in step 40 a second RTP data stream 16b to the destination party 20b based on the destination number obtained from steps 36 or 38. As part of the call setup and establishment of the second RTP stream 16b, the user interface resource 14 communicates with the H.323 resource within the IP telephony gateway 12 and stores the H.245 protocol capabilities (e.g., what codec to use, port number for sending media streams, etc.) from the IP telephony gateway 12 for the outbound call 22b in step 44. The IP telephony gateway 12 then establishes a connection via the call leg 22b and the second RTP stream 16b between the destination party 20b and the user interface resource 14, enabling the user interface resource 14 to determine whether the first RTP stream 16a and the second RTP stream 16b should be bridged.

FIG. 1 illustrates one embodiment for redirecting RTP streams to perform outbound calls with return capability. Upon detecting across the H.245 channel that the IP telephony gateway 12 has established the call leg 22b with the destination party 20b, the user interface resource 14a initiates its own RTP bridge 16c to connect the first RTP data stream 16a and the second RTP data stream 16b. At this point the subscriber 20a may converse with the destination party 20b. Once a disconnect condition is detected on the call leg 22b, the user interface resource 14a terminates the bridge 16c and continues the user interface session with the subscriber 20a.

One disadvantage of the arrangement in FIG. 1 is that the user interface resource 14a needs to set up the bridge 16c, transfer the media streams of RTP streams 16a and 16b across the bridge 16c, and tear down the bridge 16c upon completion of the call between the subscriber 20a and the destination party 20b; hence, the processing burdens on the user interface resource 14a requires substantial central processing unit (CPU) resources, affecting the scalability of the system 10a for a large number of subscribers.

According to the second embodiment described in detail below with respect to FIGS. 2 and 3B-3C, audio (RTP) transport responsibility is transferred from the user interface resource 14b to the IP telephony gateway 12, relieving the user interface resource 14b of RTP transport responsibilities while the calls are bridged. The user interface resource 14b, in response to reception of a prescribed command from the subscriber 20a across a first RTP data stream (e.g., 16a), initiates a second RTP data stream (e.g., 16b) by the IP telephony gateway 12 in steps 42 and 44 for connection via the call leg 22b to the destination party 20b, similar to the arrangement of FIG. 1.

Upon determining in step 46 a prescribed condition at the destination party 20b, for example detecting an off hook condition or in response to a prompt whether to connect the destination party 20b to the subscriber 20a, the user interface resource 14b initiates closing of the first RTP data stream 16a and the second RTP data stream 16b to the user interface resource 14b in step 48, and initiates in step 52 the connection of the data streams 16a and 16b to form the RTP bridge 16d. Specifically, the user interface resource 14b in step 48 sends Empty Capability Set Messages for the RTP data stream 16a and the RTP data stream 16b via the H.245 channel 18 to the IP telephony gateway 12. According to H.323 protocol, if the IP telephony gateway 12 receives an Empty Capability Set Message (i.e., a capabilities message that does not specify capability information), the IP telephony gateway 12 is to reset and enter a Pause state. Hence, in response to receiving the Empty Capability Set Messages for the RTP streams 16a and 16b, the IP telephony gateway 12 in step 50 closes the RTP channels 16a and 16b to the user interface resource 14 and enters a pause state, releasing the user interface resource 14b from the media streams 16 between the subscriber 20a and the destination party 20b.

After dropping the RTP connections 16a and 16b between the IP telephony gateway 12 and the user interface resource 14b, the user interface resource 14b initiates in step 52 the formation of the RTP bridge 16 to connect the RTP data stream 16a and the RTP data stream 16b internally within the IP telephony gateway 12. Specifically, the user interface resource 14b sends Non-Empty Capability Set Messages over the H.245 channels 18 for both the inbound call leg 22a and the outbound call leg 22b to the IP telephony gateway 12. The IP telephony gateway 12 in response connects the RTP media streams 16a and 16b according to H.323 protocol, effectively forming the RTP bridge 16d, by resetting its H.245 state to an initialized state in step 54, performing Master Slave Determination in step 56, and Terminal Capabilities exchange in step 58; the IP telephony gateway 12 sends an Open Logical Channel (OLC) request in step 60, and the user interface resource 14b responds in step 62 with an acknowledgment that includes media stream addresses specifying the RTP port numbers for the RTP streams 16a and 16b. The IP telephony gateway 12 thus connects (i.e., "hairpins") the media streams 16a and 16b in step 64, effectively forming the bridge 16d.

Hence, the user interface resource 14b redirects RTP streams through the IP telephony gateway 12 by sending Empty Capability Set messages to the H.323 resource module within the IP telephony gateway 12, causing the IP telephony gateway 12 to drop existing RTP streams between the IP telephony gateway 12 and the user interface resource 14b; the user interface resource 14b can then redirect the RTP data streams by sending Non-Empty Capability Set messages for both the inbound and outbound call legs 22a and 22b, enabling the IP telephony gateway 12 to use its resources in managing the call flow between the subscriber 20a and the destination party 20b.

The user interface resource 14b monitors the progress of the bridged call using the H.225/H.245 channel(s) 18. Upon detecting that the outbound call 22b is dropped by the called party 20b in step 66, the user interface resource 14b reissues an Empty Capability Set Message for the inbound call leg 22a in step 68, causing the IP telephony gateway 12 to break down the RTP bridge 16d and enter a pause state. The user interface resource 14b sends an acknowledgment on the outbound call leg 22b in step 70 to clear the call, and repeats the process for setting up the RTP stream 16a between the subscriber 20a and the user interface resource 14b in step 72 by sending a Non-Empty Capability Set message for the inbound call leg 22a.

According to the disclosed embodiment, a voice over IP based user interface system such as a voice-activated dialing application enables a subscriber to place an outbound call from a user interface session providing intelligent dial tone services, and then return to the user interface session after call completion. Use of the Empty Capability Set feature in the H.323 standard enables the redirect feature to be implemented in voice over IP systems with minimal effort. In addition, use of the voice over IP gateway to redirect the call and maintain the connections minimizes the resource requirements for the user interface system, providing scalability as the number of users are increased.

Hence, the disclosed arrangement can be utilized for various dialing-assist applications and calling services where a subscriber, having dialed into the calling services platform (e.g., such as voice-activated dialing, calling card services, etc.), is redirected to the outbound call after the calling services platform has performed any necessary operations, such as a database lookup.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a user interface resource configured for providing user interface services to a subscriber, the method comprising:

establishing a first Real Time Protocol (RTP) data stream for a user interface session executed by the user interface resource with the subscriber according to H.323 protocol;

initiating a second RTP data stream connecting the user interface resource to a destination party in response to reception of a command from the subscriber;

connecting the first and second RTP data streams in response to detecting a first prescribed condition from the destination party; and resuming the user interface session with the user interface resource in response to detecting a disconnect condition between the subscriber and the destination party.

2. The method of claim 1, wherein the initiating step includes:

determining a destination phone number from the command and initiating a call to the destination phone number;

storing H.245 protocol capabilities of the destination phone number as the call is initiated; and establishing the second RTP data stream to the destination party upon termination of the call.

3. The method of claim 2, wherein the step of initiating a call to the destination phone number includes initiating the call by the user interface resource using an IP telephony gateway.

4. The method of claim 3, wherein the step of establishing the second RTP data stream includes initiating the second RTP data stream in response to detecting an off hook condition at the destination phone number.

5. The method of claim 2, wherein the determining step includes identifying the destination phone number by one of:

using speech recognition to recognize the destination phone number from the command; and accessing a database, configured for storing telephone numbers relative to prescribed subscriber commands, for retrieval of the destination phone number based on the command.

6. The method of claim 1, wherein the first and second RTP data streams each are established via an IP telephony gateway, the resuming step including:

detecting a disconnect message based on the destination party disconnecting from the second RTP data stream;

sending an acknowledgment to the IP telephony gateway to clear the second RTP data stream; and reconnecting with the first RTP data stream to resume the user interface session via the IP telephony gateway.

7. The method of claim 6, wherein the reconnecting step includes:

issuing an Empty Capability Set Message to the IP telephony gateway for the first RTP data stream; and setting up the first RTP data stream for reception by the user interface resource.

8. A system configured for providing user interface services to a subscriber over an Internet protocol (IP) telephony link, the system comprising:

an IP telephony gateway configured for establishing Real Time Protocol (RTP) data stream connections according to H.323 protocol; and a user interface resource configured for establishing a first RTP data stream connection with the subscriber via the IP telephony gateway for a user interface session executed by the user interface resource, the user interface resource configured for initiating a second RTP data stream connecting the user interface resource to a destination party in response to a call command from the subscriber, and causing connecting of the first and second RTP data streams in response to detecting a prescribed condition from the destination party for establishment of a call between the subscriber and the destination party, the user interface resource resuming the user interface session with the subscriber in response to a detected disconnect condition between the subscriber and the destination party.

9. The system of claim 8, wherein the user interface resource is configured for causing the connecting of the first and second RTP data streams based on sending bridging commands to the IP telephony gateway, the IP telephony gateway in response closing the first and second RTP data streams to the user interface resource and bridging the first and second RTP data streams.

10. The system of claim 8, wherein the user interface resource outputs Empty Capability Set messages for the first and second RTP data streams to the IP telephony gateway across an H.245 channel, the IP telephony gateway in response closing the first and second RTP data streams to the user interface resource.

11. The system of claim 8, wherein the user interface resource, in response to detecting the disconnect condition, outputs to the IP telephony gateway an Empty Capability Set message for the first RTP data stream and an acknowledgment to clear the second RTP data stream, for reconnection of the first RTP stream with the user interface resource.

12. The system of claim 8, wherein the user interface resource determines a destination telephone number for the destination party based on recognizing speech representing the destination telephone number within the call command.

13. The system of claim 8, wherein the user interface resource determines the destination telephone number for the destination party based on retrieval from a database, configured for storing telephone numbers for prescribed destinations, using the destination party as a search key.

14. A program on a tangible computer readable medium having stored thereon sequences of instructions for executing user interface services by a user interface resource for a subscriber, the sequences of instructions including instructions for performing the steps of:

establishing a first Real Time Protocol (RTP) data stream for a user interface session executed by the user interface resource with the subscriber according to H.323 protocol;

initiating a second RTP data stream connecting the user interface resource to a destination party in response to reception of a command from the subscriber;

connecting the first and second RTP data streams in response to detecting a first prescribed condition from the destination party; and resuming the user interface session with the user interface resource in response to detecting a disconnect condition between the subscriber and the destination party.

15. The program of claim 14, wherein the initiating step includes:

determining a destination phone number from the command and initiating a call to the destination phone number;

storing H.245 protocol capabilities of the destination phone number as the call is initiated; and establishing the second RTP data stream to the destination party upon termination of the call.

16. The program of claim 14, wherein the first and second RTP data streams each are established via an IP telephony gateway, the resuming step including:

detecting a disconnect message based on the destination party disconnecting from the second RTP data stream;

sending an acknowledgment to an IP telephony gateway to clear the second RTP data stream; and reconnecting with the first RTP data stream to resume the user interface session.

17. The program of claim 16, wherein the reconnecting step includes:

issuing an Empty Capability Set Message to the IP telephony gateway for the first RTP data stream; and setting up the first RTP data stream for reception by the user interface resource.

18. A system configured for providing user interface services to a subscriber over an Internet protocol (IP) telephony link, the system comprising:

an IP telephony gateway configured for establishing Real Time Protocol (RTP) data stream connections according to H.323 protocol; and means for establishing a first RTP data stream connection with the subscriber via the IP telephony gateway for a user interface session executed by the means for establishing, the means for establishing initiating a second RTP data stream connecting the means for establishing to a destination party in response to a call command from the subscriber, and causing connecting of the first and second RTP data streams in response to detecting a prescribed condition from the destination party for establishment of a call between the subscriber and the destination party, the means for establishing resuming the user interface session with the subscriber in response to a detected disconnect condition between the subscriber and the destination party.

19. The system of claim 18, wherein the means for establishing is configured for causing the connecting of the first and second RTP data streams based on sending bridging commands to the IP telephony gateway, the IP telephony gateway in response closing the first and second RTP data streams to the means for establishing and bridging the first and second RTP data streams.

20. The system of claim 18, wherein the means for establishing outputs Empty Capability Set messages for the first and second RTP data streams to the IP telephony gateway across an H.245 channel, the IP telephony gateway in response closing the first and second RTP data streams to the means for establishing.

21. The system of claim 18, wherein the means for establishing, in response to detecting the disconnect condition, outputs to the IP telephony gateway an Empty Capability Set message for the first RTP data stream and an acknowledgment to clear the second RTP data stream, for reconnection of the first RTP stream with the means for establishing.

22. The system of claim 18, wherein the means for establishing determines the destination telephone number for the destination party based on retrieval from a database, configured for storing telephone numbers for prescribed destinations, using the destination party as a search key.

23. The method of claim 1, wherein the connecting includes the user interface resource bridging together the first and second RTP data streams.

24. The system of claim 8, wherein the user interface resource is configured for causing the connecting based on the user interface resource bridging together the first and second RTP data streams.

25. The pro gram of claim 14, wherein the connecting includes the user interface resource bridging together the first and second RTP data streams.

26. The system of claim 18, wherein the means for establishing is configured for causing the connecting based on the need for establishing bridging together the first and second RTP data streams.

* * * * *